United States Patent [19]
Teramoto et al.

[11] Patent Number: 5,301,095
[45] Date of Patent: Apr. 5, 1994

[54] HIGH POWER FACTOR AC/DC CONVERTER

[75] Inventors: Susumu Teramoto; Masaoki Sekine; Ryoji Saito, all of Tokyo, Japan

[73] Assignee: Origin Electric Company, Limited, Tokyo, Japan

[21] Appl. No.: 951,962

[22] Filed: Sep. 28, 1992

[30] Foreign Application Priority Data

Oct. 1, 1991 [JP] Japan .................. 3-280454
Feb. 24, 1992 [JP] Japan .................. 4-73499
Mar. 10, 1992 [JP] Japan .................. 4-86257

[51] Int. Cl.$^5$ .................................. H07M 7/06
[52] U.S. Cl. ............................ 363/21; 363/37; 363/81; 363/89
[58] Field of Search ................ 363/21, 37, 81, 89; H02M 7/06

[56] References Cited

U.S. PATENT DOCUMENTS

| | | | |
|---|---|---|---|
| 4,340,931 | 1/1981 | Endo et al. | 363/44 |
| 4,412,277 | 10/1983 | Mitchell | 363/81 |
| 4,523,266 | 6/1985 | Nelson | 363/26 |
| 4,525,774 | 6/1985 | Kino et al. | 363/37 |
| 4,706,180 | 11/1987 | Wills | 363/132 |
| 4,809,310 | 2/1989 | Salesses et al. | 378/109 |
| 4,956,760 | 9/1990 | Gulczynski | 363/37 |

FOREIGN PATENT DOCUMENTS

| | | | |
|---|---|---|---|
| 1-231663 | 9/1989 | Japan | H02M 7/06 |
| 1-252175 | 10/1989 | Japan | H02M 7/48 |
| 2-7870 | 1/1990 | Japan | H02M 7/06 |
| 4-87564 | 3/1992 | Japan | H02M 7/06 |

OTHER PUBLICATIONS

Technical Report of IEICE-PE93-28 (Jul. 1993) (pp. 65-71) (undated).
International Rectifier Co., "HEXFET DATA-BOOK", 1985, p. A-104, FIG. 9, Circuit Diagram of 100 KHz Wide Range Power Supply.

*Primary Examiner*—William H. Beha, Jr.
*Attorney, Agent, or Firm*—Lowe, Price, LeBlanc & Becker

[57] ABSTRACT

A high power factor AC/DC converter is disclosed. In the AC/DC converter in which a rectifying circuit RC1 rectifies a commercially available AC power supply Ei, a switching device turns on and off so that the rectified voltage is applied across the primary winding n1 of the transformer Tr1 to provide a high frequency voltage across the secondary winding n2, and the high frequency voltage is rectified by means of a rectifying circuit connected across the secondary winding so as to generate a predetermined DC output, a choke coil (L1) and a diode (D1) are interposed between the rectifying circuit (RC1) and a smoothing capacitor (C1) and a capacitor (C3) is interposed between a first junction and a second junction. The first junction connects the choke coil (L1) to the diode (D1) and the second junction connected the switching device (Q1) to the primary winding (n1) of the transformer (Tr1).

23 Claims, 11 Drawing Sheets

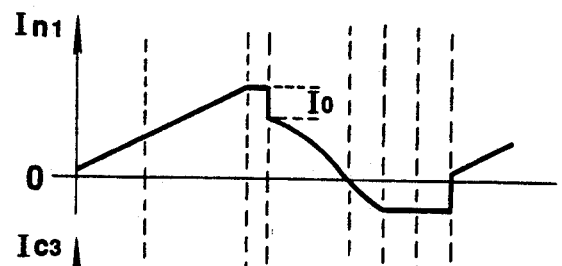
FIG.4 (A)
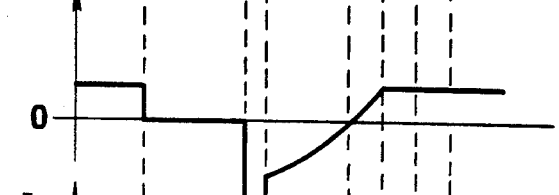
FIG.4 (B)
FIG.4 (C)
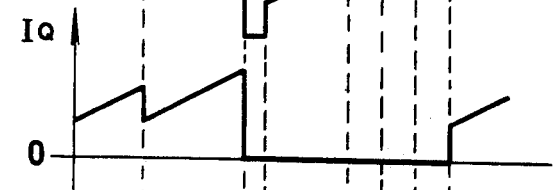
FIG.4 (D)
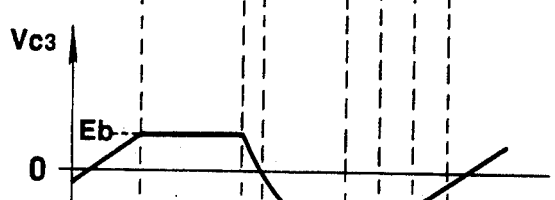
FIG.4 (E)
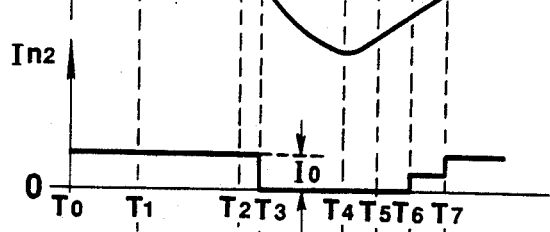
FIG.4 (F)
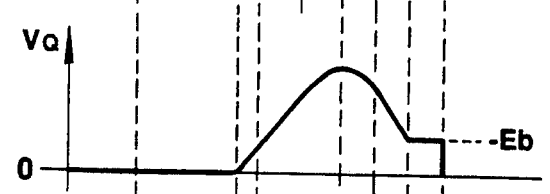
FIG.4 (G)
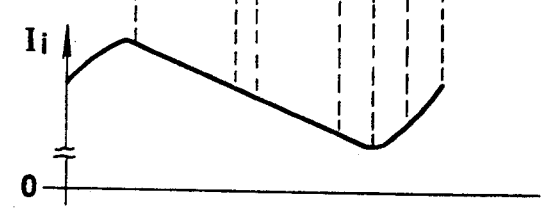

HIGH POWER FACTOR AC/DC CONVERTER

BACKGROUND OF THE INVENTION

1. Field of The Invention

The present invention relates generally to a circuit of AC/DC converter which converts a commercially available alternating current power supply voltage into a stable DC output voltage, particularly, relates to the AC/DC converter having a high power factor.

2. Description of The Background Art

FIG. 1 shows a conventional AC/DC converter which converts the received commercially available alternating current (AC) power supply into a direct current (DC) voltage.

In FIG. 1, the AC/DC converter includes an input rectifying circuit RC1 which carries out a full rectification of an input alternating current voltage $E_i$, a smoothing capacitor C1, a field effect transistor Q1 which serves as a switching device, a transformer Tr1, transformer magnetically resetting diode D4, an output rectifying diode D2, a flywheel diode D3, an output smoothing choke coil L2, and an output smoothing capacitor C2. Thus, the AC/DC converter serves to convert the alternating input voltage $E_i$ into a stable DC output voltage $E_0$.

Although, in such an AC/DC converter as described above, a desired characteristic is exhibited for the output DC voltage, the input current thereof $I_i$ flows only at a time at which a peak of the instantaneous input alternating current voltage $E_i$ approximately appears as appreciated from FIG. 2.

Therefore, a power factor of the AC/DC converter shown in FIG. 1 is as low as about 0.5 through 0.7.

To improve the power factor, a method of inserting a large sized choke coil into the rectifying circuit has been proposed. However, the size and weight of the AC/DC converter are too large and heavy.

Another method for improving the power factor is to install a pre-converter to electronically improve the power factor has been proposed. However, the other method introduces the increased number of parts and components, large-sized and expensive AC/DC converter, and interferences between the switching devices in the AC/DC converters.

SUMMARY OF THE INVENTION

It is, therefore, a principal object of the present invention to provide a structure of AC/DC converter which is simple in circuit structure, small in size, light in weight, and sufficiently economical.

The above-described object can be achieved by providing an AC/DC converter, comprising; a) a pair of input terminals to be connected across a commercially available AC power supply; b) a full wave rectifying circuit having a pair of input terminals connected across the pair of input terminals of the AC power supply and having a pair of rectified output terminals; c) a first choke coil having one terminal connected to one of the pair of the rectified output terminal of the full wave rectifying circuit; d) a first capacitor one end connected to the other terminal of the first choke coil; e) a first diode whose anode terminal is connected to the other end of the first choke coil; f) a control circuit for generating an on and off drive signal having a relatively high frequency as compared with a frequency of the AC power supply; g) a second capacitor one end thereof connected to its cathode terminal of the first diode and the other end connected to the other of the pair of the rectified output terminal; h) switching means having a pair of main electrodes and drive electrode terminals, its drive electrode terminal being driven in response to the on and off drive signal by means of the control circuit so that said switching means is turned on and off, one of the main electrodes being connected to the other end of the first capacitor, and the other main electrode being connected to the other end of the second capacitor;i) a transformer having at least primary winding and secondary winding, one end of its primary winding connected to the cathode of the first diode and the other end of the primary winding being connected to the other end of the first capacitor; and j) rectifying means connected across the secondary winding of the transformer, the rectifying means having a pair of output terminals of the AC/DC converter.

The above-described object can also be achieved by providing an AC/DC converter, comprising: a) a pair of input terminals to be connected to a commercially available single phase AC power supply; b) a full wave rectifying circuit having a pair of input terminals connected across said pair of input terminals to be connected to the commercially available AC power supply and having a pair of plus and minus rectified output terminals; c) a smoothing capacitor having a plus end connected to the plus rectified output terminal of the full wave rectifying circuit and a minus end connected to the minus rectified output terminal thereof; d) a transformer having at least one primary winding and secondary winding; e) switching means having a pair of main electrodes and a drive electrode, both main electrodes being connected between said primary winding and the minus rectified output terminal of said full wave rectifying circuit, being turned on when the drive electrode receives an on drive signal, and being turned off when the drive electrode receives an off drive signal and a frequency of said on and off drive signals being higher than the frequency of said commercially available AC power supply; f) an inductor providing a constant current supply connected between the plus rectified output terminal of said full wave rectifying circuit and a positive end of said primary winding; g) a diode interposed between the first inductor and the positive end of said primary winding for blocking a current flow from said primary winding into said inductor; h) a capacitor interposed between a junction between said first inductor and a negative end of said primary winding, said capacitor being charged according to a current flow from said inductor until its terminal voltage is equal to a terminal voltage across the smoothing capacitor when said main electrodes of said switching means are turned on so that the current energy is stored therein and a stored charge in said smoothing capacitor is supplied to said primary winding and its terminal voltage across said capacitor being reversed and said transformer being reset when a current route is formed in a loop in which the current energy is caused to flow from said primary winding, capacitor, and diode while said smoothing capacitor is charged via said diode when said main electrodes of said switching means are turned off; and i) another rectifying circuit connected across the secondary winding of said transformer for providing a DC output voltage across a pair of output terminals of the AC/DC converter.

The above-described object can also be achieved by providing an AC/DC converter, comprising; a) an AC power supply; b) a full wave rectifying circuit having a pair of input terminals connected across the AC power supply and having a pair of rectified output terminals; c) a first choke coil having one terminal connected to one of the pair of the rectified output terminal of the full wave rectifying circuit; d) a first capacitor one end connected to the other terminal of the first choke coil; e) a first diode whose anode terminal is connected to the other end of the first choke coil; f) a control circuit for generating an on and off drive signal having a relatively high frequency as compared with a frequency of the AC power supply; g) a second capacitor one end thereof connected to its cathode terminal of the first diode and the other end connected to the other of the pair of the rectified output terminal; h) switching means having a pair of main electrodes and drive electrode terminals, its drive electrode terminal being driven in response to the on and off drive signal by means of the control circuit so that said switching means is turned on and off, one of the main electrodes being connected to the other end of the first capacitor, and the other main electrode being connected to the other end of the second capacitor; i) a transformer having at least primary winding and secondary winding, one end of its primary winding connected to the cathode of the first diode and the other end of the primary winding being connected to the other end of the first capacitor; and j) rectifying means connected across the secondary winding of the transformer, the rectifying means having a pair of output terminals of the AC/DC converter.

BRIEF DESCRIPTION OF THE DRAWINGS

FIGS. 4(A) through 4(G) are waveform charts for explaining an operation of the first embodiment shown in FIG. 3.

DESCRIPTION OF THE PREFERRED EMBODIMENTS

Reference will hereinafter be made to the drawings in order to facilitate a better understanding of the present invention.

Figure 1:
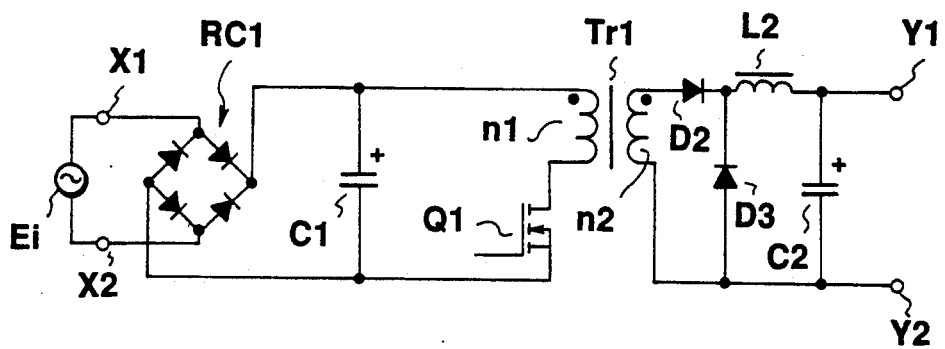
FIG. 1 is a conventional AC/DC converter described in the BACKGROUND OF THE INVENTION.
Figure 2:
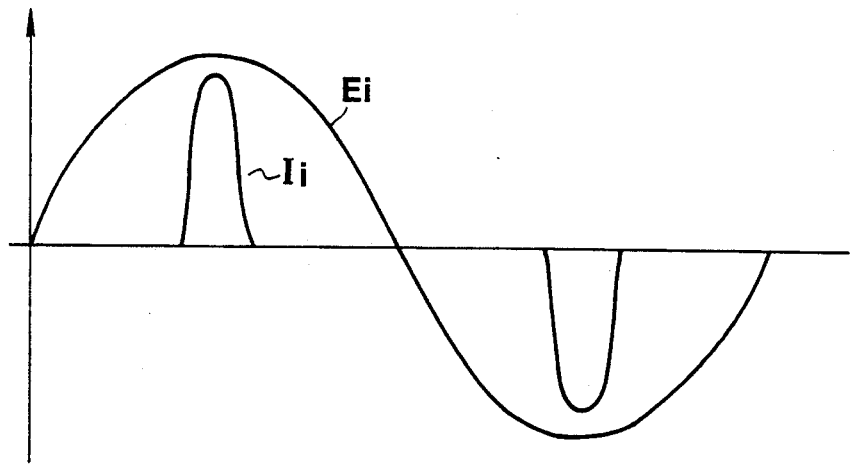
FIG. 2 is a waveform chart of the input AC current (Ii) and AC voltage (Ei) of the AC/DC converter shown in FIG. 1.

It is noted that FIGS. 1 and 2 have already been explained in the BACKGROUND OF THE INVENTION.

First Embodiment

Figure 3:
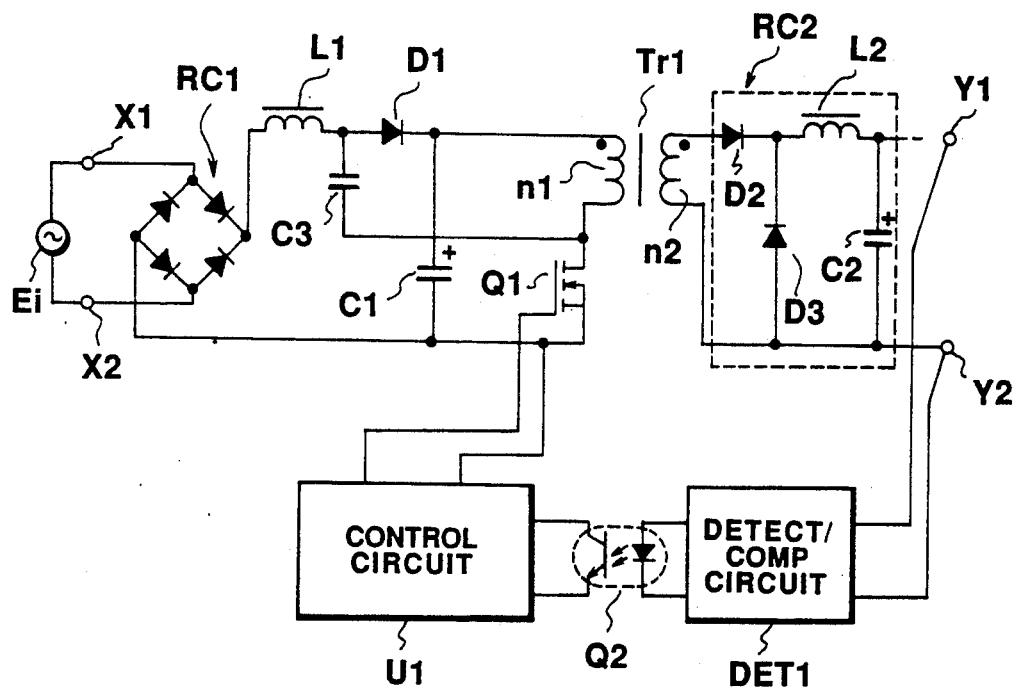
FIG. 3 is a circuit diagram of an AC/DC converter in a first embodiment according to the present invention.

FIG. 3 shows a first embodiment of an AC/DC converter according to the present invention.

In FIG. 3, a commercially available AC power supply $E_i$ is connected across a bridge type (full wave) rectifier RC1 via input terminals X1 and X2.

A positive DC output terminal of the rectifier RC1 is connected to a plus end of a capacitor C1 via a choke coil (having a core) L1 and diode D1 and a negative DC output terminal of the rectifier RC1 is connected to a minus end of the capacitor C1. A junction between the choke coil L1 and diode D1 is connected to a drain electrode of a field effect transistor Q1 via a capacitor C3. Its source electrode of the transistor Q1 is connected to the minus end of the capacitor C1. A gate electrode of the transistor Q1 is connected to a control circuit U1 which serves as a switching regulator so that the transistor Q1 is driven to turn ON and OFF in response to a drive signal derived from the control circuit U1 at a high frequency of about 100 KHz.

The above-described portion of the circuitry serve as a rectifying chopper circuit.

In details, while the input AC voltage $E_i$ (generally, in Japan, 100 V effective value and 50 Hz East half of Japan) is rectified by means of the rectifier RC1 and rectified voltage is supplied across the transistor Q1 via the choke coil L1 and capacitor C3. The transistor Q1 repeats the ON and OFF operations at the frequency of about 100 KHz. For example, in the first embodiment, the choke coil L1 has an inductance of about 500 $\mu$H (micro Henry) and the capacitor C3 has a capacitance of 0.02 $\mu$F (micro Farad), and the capacitor C1 has the capacitance of 200 $\mu$F.

When the transistor Q1 is turned on, the input AC rectified current flows from the choke coil L1 to charge the capacitor C3. This current flows during an interval of time until a voltage across the capacitor C3 reaches a voltage across the capacitor C1 so that an energy (power) is stored in the choke coil L1 and capacitor C3. When the field effect transistor Q1 is, in turn, turned off, the current energy stored in the choke coil L1 charges the capacitor C1 via the diode D1.

Since an electrostatic capacitance of the capacitor C1 has a sufficiently large value, the substantially constant voltage Eb is maintained across the capacitor C1 in a steady state. In addition, since the input AC current always passes through the choke coil L1, the current is continued.

Next, the plus input end of the capacitor C1 is connected to the drain electrode of the transistor Q1 via a primary winding n1 of the transformer Tr1.

A secondary winding n2 of the transformer Tr1 is connected to a smoothing capacitor C2 via a smoothing choke coil L2 and a diode D2 and connected across output DC terminals Y1 and Y2.

A detection/comparison circuit DET1 is connected across the DC output terminals Y1 and Y2.

It is also noted that output terminals of the detection/comparison circuit DET1 are coupled with a photo coupler Q2 which is optically connected to detection input ends of the control circuit U1.

The detection/comparison circuit DET1 is generally constituted by a switching regulator IC, e.g., TL494 of Texas Instrument, Inc. available on the market or an equivalent IC to which an output current amplifier and some auxiliary parts are added.

In addition, the detection/comparison circuit DET1 is constituted by a resistance divider and constant voltage (zener) diode. Then, the photo-coupler Q2 has a sufficient withstanding voltage to isolate the commercially available AC current power supply $E_i$.

A flywheel diode D3 is connected across a junction between the diode D2 and the smoothing choke coil L2 and the other end of the secondary winding n2 of the transformer Tr1. This portion serves as a forward type converter and is used to reset the transformer Tr1 through an inherent vibration (resonance vibration) between the primary winding n1 of the transformer Tr1 and capacitor C3.

While the transistor Q1 is turned on, the stored charge across the capacitor C1 serves to supply the power to the output terminals Y1 and Y2 via the primary winding n1 of the transformer Tr1 and successive circuit stage. While the transistor Q1 is turned off, the current energy flowing through the primary winding n1 of the transformer Tr1 flows via a route of capacitor C3 and diode D1 to reset the transformer Tr1 and to reverse the voltage across the capacitor C3.

Next, an operation of the first embodiment shown in FIG. 3 will be described below with reference to FIGS. 4(A) through FIG. 5.

Suppose that a switching frequency of the transistor Q1 is sufficiently higher than the frequency of the input AC voltage power supply. Hence, the input AC voltage during one cycle of the switching operation of the transistor Q1 is deemed to be constant. In addition, since the choke coil L1 has a large inductance with respect to the switching frequency of the transistor Q1, the choke coil L1 provides a constant current supply. Furthermore, a self inductance of the transformer Tr1 is considerably small as compared with that of the choke coil L1 and winding ratio thereof is 1:1. The inductance of the choke coil L2 is sufficiently large and the output filtering choke coil L2 provides a current supply.

The operation of the first embodiment shown in FIG. 3 will be described in details below with time intervals divided into T0, T1, . . . , T7 shown in FIGS. 4(A) through 4(G).

Time interval from T0 to T1

When the field effect transistor Q1 is turned on at a time of T0, the current flowing in a closed loop of $E_i \rightarrow L1 \rightarrow C3 \rightarrow n1 \rightarrow C1 \rightarrow E_i$ is, in turn, caused to flow into the transistor Q1 via the capacitor C3. At the same time, the voltage Eb across the capacitor C1 is applied across the primary winding n1 of the transformer Tr1 and the same voltage is generated across the secondary winding n2 so that the current which has flown into the choke coil L2 is wholly commutated into the secondary winding n2. Hence, the current of the primary winding n1 of the transformer Tr1 exhibits a stepwise change of the current which has flown into the diode D3, as shown in FIG. 4(A), at the time of T0 and, thereafter, the current of the primary winding n1 is raised at a gradient of Eb/L0 (L0 denotes the self inductance of the transformer Tr1). Then, the current il flowing through the choke coil L1 is expressed as follows:

$$i_1 = J \cdot \sin(\omega_1 t + \alpha) \quad (1),$$

wherein $$J = \sqrt{J_{10}^2 + \omega_1^2 C_3^2 (E_i + V_{CO})^2}$$

$$\alpha = \tan^{-1} J_{10}/\omega_1 C_3 (E_i + V_{CO})$$

$$\omega_1^2 = 1/L_1 \cdot C_3$$

$J_{10}$ denotes an initial current flowing through the choke coil L1, $V_{CO}$ denotes an initial voltage across the capacitor $C_3$, and $C_3$ denotes a capacitance across the capacitor C3.

In the equation (1), the initial value of $i_1$ is different depending on a phase of the input AC voltage $E_i \cdot J_{10}$ becomes larger as the input voltage $E_i$ becomes higher. Conversely, as the input voltage $E_i$ becomes higher, the value of $V_{CO}$ becomes smaller.

Hence, $\alpha$ provides a larger value as the phase of the input voltage $E_i$ provides a higher value from zero to peak (90 degrees). That is to say, $\alpha$ provides generally 50 degrees to 80 degrees when the level of the alternating input voltage changes from zero to peak. In addition, the interval time of $T_1 \sim T_2$ is an interval of time within which the capacitor C3 is charged until its voltage reaches the voltage $E_b$. The completion of charging becomes earlier, at the phase of the instantaneous alternating voltage which provides a higher value. Therefore, at the time of the present phase at which the input instantaneous alternating voltage gives a lower value, the time interval of $t_1$ to $t_2$ becomes as long as approximately $1.5 \sim 5 \, \mu S$.

The waveform of input current $I_{C3}$ is shown in FIG. 4(B). Then, the voltage $V_{C3}$ across the capacitor $C_3$ is raised substantially linearly as shown in FIG. 4(D). The current $I_Q$ flowing into the field effect transistor Q1 is a sum of the current $I_{n1}$ flowing into the winding n1 and that $I_{C3}$ flowing through the capacitor C3 (refer to FIG. 4(C)). The current $I_{n2}$, flowing through the secondary winding of the transformer Tr1, is partially derived from the current which has flown into the diode D3 so as to make equal to the output current I0 as shown in FIG. 4(E).

Time Interval of T1-T2

At the time of T1 at which the voltage across the capacitor C3 becomes equal to the voltage $E_b$ of the capacitor C1, the voltage thereacross is clamped to $E_b$ so that the current in the choke coil L1 flows into the capacitor C1 via the diode D1. Hence, the current $I_Q$ flowing through the field effect transistor Q1 continues to rise at the gradient of $E_b/L0$ although the current flowing through the capacitor C3 becomes null.

In addition, the output current $I_0$ is supplied via the transformer Tr1 from the capacitor $C_1$ of the AC/DC converter shown in FIG. 3.

The current $i_1$ flowing through the choke coil L1 is expressed in the following equation (2) provided that the voltage across the capacitor C3 is constant.

$$i_1 = (E_i - E_b)t/L_1 + J_{20} \qquad (2),$$

wherein $J_{20}$ denotes an initial current of the choke coil $L_1$ at the time of $T_1$.

The current $i_1$ is reduced according to the equation (2) since the value of $E_b$ is always higher than that of $E_i$. As the instantaneous input voltage $E_i$ gives higher value at the present phase, the reduction gradient is moderate.

This operation mode is continued until $T_3$ at the time of which the field effect transistor Q1 is turned off. A conduction interval of the transistor Q1 is generally constant if a load and effective value of the input voltage remain unchanged. This interval of time becomes longer as the instantaneous input voltage has a higher value at the present phase, i.e., approximately 0 through 3.5 μS.

Time Interval of $T_2$-$T_3$

When the field effect transistor Q1 is turned off at the time of $T_2$, the energizing current which has flown in the primary winding n1 is, in turn, caused to flow in a closed loop of n1→C3→D1→n1.

The voltage across the transistor Q1 is increased from zero in accordance with the voltage across the capacitor C3 (refer to FIG. 4(F)). The current flowing in the secondary winding n2 of the transformer Tr1 is continued to flow since the voltage across the capacitor C3 is applied to the primary winding n1 of the transformer Tr1 even after the transitor Q1 is turned off. Then, the current of the choke coil $L_1$ is continued to be decreased and to flow through the capacitor C1 as expressed in the equation (2). At this time, the current $i_3$ flowing into the capacitor C3 is given by:

$$i_3 = -\sqrt{(\omega_3 C_3 E_b)^2 + K_{30}^2} \, \sin(\omega_3 t + \gamma) - I_0, \qquad (3)$$

wherein $$\omega_3^2 = 1/L_0 \cdot C_3$$

$$\gamma = \tan^{-1}(k_{30}/\omega_2 C_3 E_b)$$

$K_{30}$ denotes the initial current of L0 (a value of subtraction of the output current from the primary winding current at the time of $T_2$) and, $I_0$ denotes the output current of the AC/DC converter.

In the equation (3), since $K_{30}$ indicates a large value, the value of $\gamma$ gives approximately 70 degrees and the change in the current 13 becomes minor and is deemed to substantially be constant. This operation mode is continued until the voltage across the capacitor C3 becomes zero. The time interval of $T_2 \sim T_3$ indicates 1 μS or less.

Time interval T3-T5

When the voltage across the capacitor C3 indicates zero at the time of T3 as shown in FIG. 4(D), the voltage across the primary winding n1 of the transformer Tr1 also indicates zero so that the current of the secondary winding n2 is interrupted and the current of the choke coil L2 is continued to flow via the flywheel diode D3.

Hence, the current through the primary winding $I_{n1}$ of the transformer Tr1 is decreased by the output current $I_0$ at the time of T3 as shown in FIG. 4(A) and, thereafter, a free vibration between the energization inductance $L_0$ and capacitance C3 is continued so that the voltage across the capacitor C3 is reversed and becomes negatively larger. Then, the voltage across the field effect transistor Q1 is continued to rise in accordance with the voltage across the capacitor C3.

At the time of $T_4$, the direction of the current $I_{n1}$ flowing into the primary winding n1 is reversed and the voltage $V_{C3}$ across the capacitor C3 reaches a negative peak value (refer to FIG. 4(D)) so that the voltage $V_{C3}$ thereacross continues the vibration until the time reaches $T_4$ at which the current $I_{n1}$ of the primary winding n1 equals to that of the choke coil L1. Hence, the current $I_{C3}$ flowing into the capacitor C3 indicates the current $i_3$ of the equation (3) to which $I_0$ is added. A time duration between the time T3 and T4 indicates approximately 2 μS or longer without influence of the input voltage phase. The time duration between T4 and T5 becomes longer as the input current becomes larger. Therefore, the time duration between T4 and T5 becomes longer when the present phase is such that the instantaneous input voltage becomes higher. The difference between the time durations described above indicates about 1 μS.

Time interval of T5-T6

When the current in the choke coil L1 becomes less than the current in the primary winding n1 at the time of T5, the diode D1 blocks the current flow therethrough and the current flows in such a closed loop as Ei→L1→C3→n1→C1→Ei.

Since the choke coil L1 has considerably large inductance as compared with the energization inductance $L_0$ at the transformer Tr1, a rate of change in the current flowing into the primary winding n1 becomes minor and the voltage across the primary winding is abruptly decreased. Then, the voltage across the transistor Q1 is accordingly reduced. The voltage across the capacitor C3 is substantially linearly changed.

At this time, the current $i_1$ which flows through the choke coil L1 is expressed as follows:

$$i_1 = J_5 \sin(\omega_4 t + \delta) \qquad (4),$$

wherein $$J_5 = \sqrt{J_{50}^2 + \omega_4^2 C_3^2 (E_i - E_b - V_{C50})^2}$$

$$\omega_4^2 = 1/(L_1 + L_0)C_3$$

$$\delta = \tan^{-1}\{J_{50}/\omega_4 C_3 (E_i - E_b - V_{C50})\}$$

$J_{50}$: initial current of the choke coil L1 at the time of T5, and $V_{C50}$ = initial voltage across the capacitor $C_3$.

In the equation (4), the relation between $E_i$ and $V_{C50}$ is such that the initial value of $V_{C50}$ becomes negatively large (approximately −350 volts) when Ei provides the present phase at which Ei indicates a lower intantaneous voltage value and the interval of time between T3 and T5 becomes accordingly short. In addition, as Ei becomes large, the initial value of $V_{C50}$ becomes substantially zero. Hence, $\delta$ indicates approximately 50 degrees when the input voltage Ei is in the vicinity to zero and indicates substantially zero as the input voltage Ei becomes larger. In addition, $\omega_4$ becomes shorter as compared with the time interval between T3 and T5 since L1 is larger than L0, so that the current change of $i_1$ becomes moderate. The waveform of the input current $I_i$ is shown in FIG. 4(G).

The voltage $V_Q$ across the field effect transistor Q1 is shown in FIG. 4(F). That is to say, the value of voltage $V_Q$ is derived by a sum of the voltage Eb across the capacitor C1 and the derivative of $i_1$ in the equation (4) by which the inductance of L0 is multiplied.

Time interval of T6–T7

When the voltage across the primary winding n1 of the transformer Tr1 becomes zero at the time of T6 and its polarity is reversed, the current in the choke coil L2 is branched into the diode current D3 and secondary winding n2. Therefore, the primary winding voltage is suppressed to zero and the voltage $V_Q$ across the field effect transistor Q1 is clamped to Eb during the time interval of $T_6$ to $T_7$. Since the voltages across the transformer windings are reduced to zero, the change in the energization current becomes null so that the change in the current generated due to the vibration according to the choke coil L1 and capacitor C3 is caused to flow into each winding of the transformer Tr1 as the branched current of the current in the choke coil L2.

Thus, the current $i_1$ of the choke coil L1 can be expressed as follows:

$$i_1 = J_6 \sin(\omega_1 t + \epsilon) \quad (5)$$

$$\text{wherein } J_6 = \sqrt{J_{60}^2 + \omega_1^2 C_3^2 (Ei - Eb - V_{C60})^2}$$

$$\epsilon = \tan^{-1}\{J_{60}/\omega_1 C_3(Ei - Eb - V_{C60})\}$$

$J_{60}$: initial current at the choke coil L1, and
$V_{C60}$: initial voltage across the capacitor C3.

At the time of T7, the field effect transistor Q1 is again turned on, the same operation from the time T0 at the next cycle is repeated. FIG. 4(G) shows the waveform of the current $1_i$ flowing through the choke coil L1.

As described above, one period of the transistor switching from the on state to the off state has been explained.

Next, the input current $I_o$ at the one cycle of commercially available alternating current will be described below.

A front part of the converter circuitry is constituted by, so-called, voltage boost chopper circuit so that the input current is continued to flow over the whole range of the input voltage succession. During the interval of time from T0 to T1, the input current serves to charge the capacitor C3 until its charged voltage is equal to the voltage Eb across the capacitor C1 so as to store the energy into the choke coil L1 during the switching device of the transistor $Q_1$ turned on.

After the charge of the capacitor C1 up to the voltage Eb, the capacitor C1 is charged by a sum of the energy stored in the choke coil L1 and input voltage irrespective of the switching state. For the input current during the time interval of T0 to T1, the current integrated quantity is the same if the voltage across the capacitor C3 during the switching on time is the same over the whole range of the input voltage and the initial value of voltage across the capacitor C3 is approximately inversely proportional to the input voltage. This is because a point of the time T5 (a point of time at which the current flowing through L1 is the same as that flowing through L0 and the diode D4 is cut off) becomes later as the input voltage becomes higher so that the voltage across the capacitor C3 becomes near to zero. Hence, the input current incremental quantity when the transistor Q1 is turned on becomes larger as the input voltage becomes lower. On the other hand, since in a reset mode of the choke coil L1 during the time interval of T1 to T5 a difference voltage between the input voltage and voltage across the capacitor C1 determines a reset quantity, the input current becomes reduced as the input voltage becomes lower. Hence, the integrated quantity of the input current at one cycle of switching receives influence from the AC input voltage variation. However, if a simulation is carried out for one period of AC frequency, a waveform of sinusodial wave on which a DC component is superposed as shown in FIG. 5. This waveform corresponds to about 0.98 of the power factor.

An output voltage of a forward coupled converter is determined by a voltage to be applied to the primary winding n1 of the transformer Tr1 and by a duty ratio thereof unless the current of the filter choke coil L2 is cut off. Hence, a duty ratio ontrol is carried out which compensates for a voltage variation of the converter circuitry by means of a control circuit U1 so that the output voltage is maintained at the constant voltage against any load variation.

At this point, the converter circuitry in the first embodiment carries out the duty ratio control through only one transistor Q1 which is a switching device so that the output voltage is maintained at the constant voltage. On the other hand, the field effect transistor Q1 serves as the switching device of the chopper circuitry for the variation in the AC input voltage so as to carry out the same duty factor control. Consequently, the mutual internal circuits function to carry out the duty ratio control so to provide and maintain a stable DC output voltage.

It is noted that the field effect transistor Q1 can be replaced with another switching device such as a bipolar transistor and an opposite polarity of each semiconductor switching device can be employed.

In the first embodiment, the dimension may be replaced with a suitable value or combination of those values which provide the same operation mode.

It is also noted that a smoothing filter may be added into the output DC circuit. Although the detect/comparison circuit DET1 is connected across the output terminals, it may be connected across both ends of a load remotely located. Alternatively, a winding for the voltage detection may be installed to the transformer Tr1 so as to detect the output voltage. In addition, a plurality of secondary windings may be installed into the transformer Tr1, each secondary winding having a rectifying/smoothing circuit and a pair of output terminals.

Second Embodiment

Figure 6:
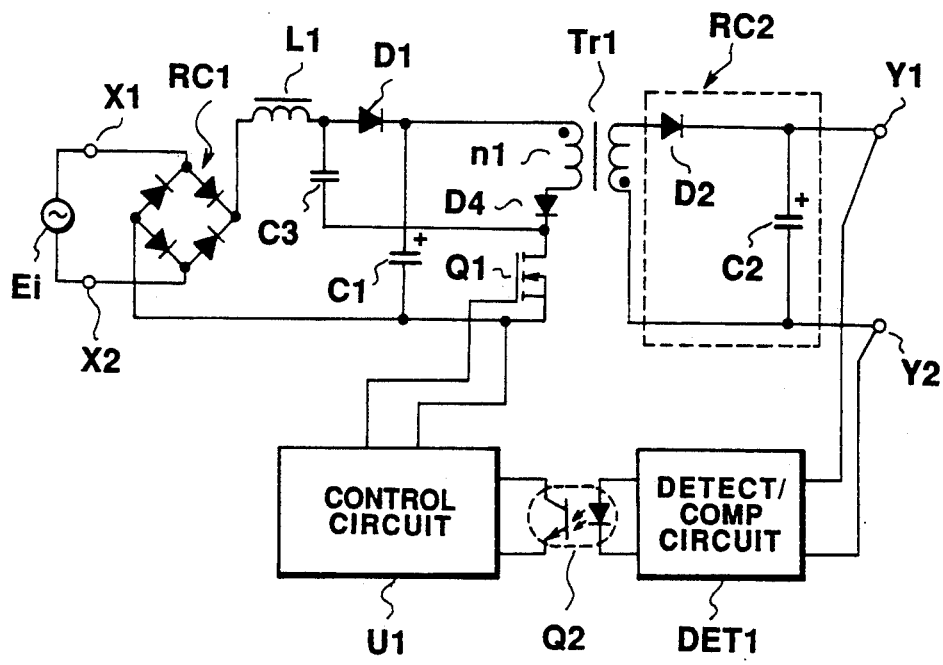
FIG. 6 is a circuit diagram of an AC/DC converter in a second embodiment according to the present invention.

FIG. 6 shows a second embodiment of the converter according to the present invention.

The differences from the first embodiment shown in FIG. 3 are in the following points:

1) a connection polarity of the transformer Tr1 is a reversed polarity to the case shown in FIG. 3 (as denoted by dot marks of FIG. 3 and of FIG. 6);

2) the secondary side rectifying circuit is formed of a halfwave rectifying circuit constituted by the diode D2 and capacitor C2 only; and 3) a diode D4 is connected in series to the primary winding n1 of the transformer Tr1 with the polarity thereof shown in FIG. 6.

The operation mode is changed from the feedforward type to a flyback type. The purpose of obtaining a high power factor in the second embodiment is common to the first embodiment.

The operation of the second embodiment will be described below with each waveform being divided according to the time intervals of T0, T1, - - -, and T5 as shown in FIGS. 7(A) through 7(G).

Time interval of T0 to T1

If the field effect transistor Q1 is turned on at the time of T0, the current which has flown in the closed loop of Ei→L1→D1→C1→Ei is flown into the field effect transistor Q1 charging the capacitor C3.

Figure 7:
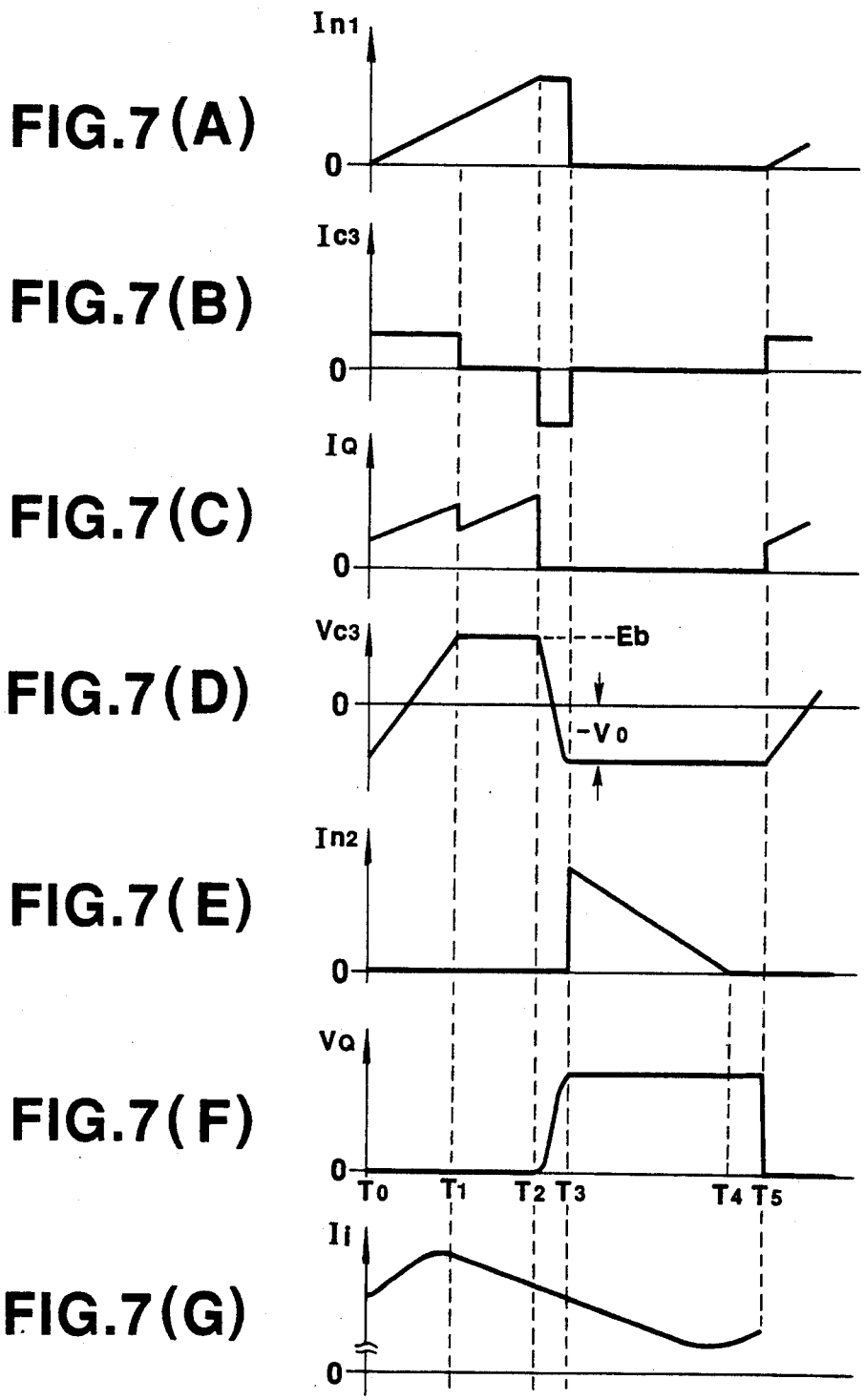
FIGS. 7(A) through 7(G) are waveform charts for explaining an operation of the AC/DC converter in the second embodiment shown in FIG. 6.

At the same time, although the voltage Eb across the capacitor C1 is applied across the primary winding n1 of the transformer Tr1, the polarity of voltage across the secondary winding n2 is negative with respect to the output voltage E0 and the diode D2 serves to block the current flow in the secondary winding n2. Hence, an energization current of the primary winding n1 is started to flow as in the closed loop of C1→n1→D4→Q1→C1 and raised at the gradient of Eb/L0 as shown in FIG. 7(A) (L0: energization inductance of the transformer Tr1).

The current flowing into the choke coil L1 is expressed in the same form as the equation (1).

In the equation (1), the initial value is different from the phase of the input voltage Ei.

As $J_{10}$ in the equation (1) becomes larger as the input voltage Ei becomes larger, the value of $V_{C0}$ is substantially constant irrespective of the input voltage Ei. Hence, as α becomes large as the higher input voltage Ei has the phase, α indicates approximately 50 degrees to 80 degrees when the AC input voltage goes from zero to peak. In addition, the interval of time from T1 to T2 is time duration during which the capacitor C3 is charged to the voltage Eb of the capacitor C1.

As the input voltage has a higher phase, the completion of charging becomes faster. As the input voltage has a lower phase, the completion thereof becomes as longer as approximately 5.0 μs through 2.0 μs.

The input voltage waveform is shown in FIG. 7(B).

Then, the voltage across the capacitor C3 is raised approximately linearly as shown in FIG. 7(D).

The current flowing into the transistor Q1 is a sum of the current flowing into the primary winding n1 and the current flowing into the capacitor C3. The secondary winding current In2 of the transformer Tr1 is cut off by means of the diode D2 so as to become zero shown in FIG. 7(E) at the time interval thereof (T0-T1).

Time Interval of T1-T2

When the voltage across the capacitor C3 is clamped to the voltage Eb across the capacitor C1, the current through the choke coil L1 is caused to flow into the capacitor C1 via the diode D1. Hence, the current flowing into the field effect transistor Q1 is raised at the gradient of Eb/L0 although the current flowing into the capacitor C1 becomes null. The waveform of the current described above is shown in FIGS. 7(B) and 7(C).

The current i1 flowing through the choke coil L1 is expressed in the equation (2) if the voltage across the capacitor C3 is constant.

Since the voltage Eb is always higher than Ei, the current Ii becomes reduced as appreciated from the equation (2). In addition, the gradient of decrease becomes moderate as the higher instantaneous input voltage Ei has the present phase.

The above-described operation mode is continued until the field effect transistor Q1 is turned off. The conduction interval of the field effect transistor Q1 becomes substantially constant if the load and effective value of the input voltage remain unchanged. Therefore, the interval becomes longer as the higher instantaneus input voltage has the present phase. This interval then indicates approximately 0 to 3.0 μs.

Time Interval of T2 to T3

When the field effect transistor Q1 is turned off at the time of T2, the energization current flows into the closed loop of n1→D4→C3→D1→n1. The voltage across the field effect transistor Q1 is raised from zero in accordance with the voltage across the capacitor C3. On the other hand, the current following through the secondary winding n2 of the transformer Tr1 still does not flow even after the field effect transistor Q1 is turned off since the voltage across the capacitor C3 is applied to the primary winding n1 of the transformer Tr1. Then, the current flowing into the choke coil L1 continues to reduce and flow into the capacitor C1 as expressed generally as in the equation (2).

The current i3 flowing into the capacitor C3 is expressed in the equation (6).

$$i_3 = -\sqrt{(\omega_3 C_3 E_b)^2 + K_{30}^2} \; \sin(\omega_3 t + \gamma) \quad (6)$$

$$\omega_3^2 = 1/L_0 \cdot C_3$$

$$\gamma = \tan^{-1} K_{30}/\omega_3 C_3 E_b$$

$K_{30}$: initial current of $L_0$ at the time of T2 (a value of primary winding current from which the output current is subtracted)

Since in the equation (6) $K_{30}$ is large and γ gives approximately 70 degrees, the change in $i_3$ becomes reduced and is deemed to be constant. This mode of operation is below 1 μS which is an interval of time until the voltage across the capacitor C3 indicates zero.

Time Interval of T3-T4

When the voltage across the capacitor C3 indicates $-V_0$ at the time of T3, the voltage across the primary winding n1 of the transformer Tr1 also indicates $-V_0$ so that a current is started to flow into the secondary winding n2. Then, the voltage across the secondary winding is clamped to the output voltage $E_0$ and the primary winding voltage is also fixed to $E_0$.

When the primary winding voltage is fixed to the constant of $E_0$, the charge into the capacitor C3 is ended so that the primary winding current In1 of the transformer Tr1 becomes zero at the time of T3 as shown in FIG. 7(A) and the stored energy therein is commutated to the secondary winding n2.

The secondary winding current In2 is decreased at the gradient of $E_0/L_0$ as shown in FIG. 7(E). The voltage across the transistor Q1 is a sum of voltage among the voltage across the capacitor C3, the voltage across the primary winding n1, and the output voltage $E_0$.

The current flowing into the secondary winding n2 gives zero at the time of T4 so that the energy stored in the energization inductance at the transformer Tr1 is wholly dissipated. The current of the choke coil L1 is continued into the capacitor C1 as expressed in the equation (2). The time duration between the time T3 and time T4 is determined according to the value of the output current $I_0$. It is about 4 $\mu$s at the time of the maximum output current.

Time Interval of T4–T5

This interval of time is an interval from a time at which the current of the secondary winding gives zero to a time at which the field effect transistor Q1 is turned on.

The current flowing into the choke coil L1 is an interval of time at which the capacitor C1 is charged.

The input current is expressed continuously from the time of T1 to the time of T5 in the equation (2).

At the time of T5, the field effect transistor Q1 is again turned on and the same operation at the time of T0 in the next cycle is repeated. The waveform of the current Ii across the choke coil L1 is shown in FIG. 7(G).

Figure 5:
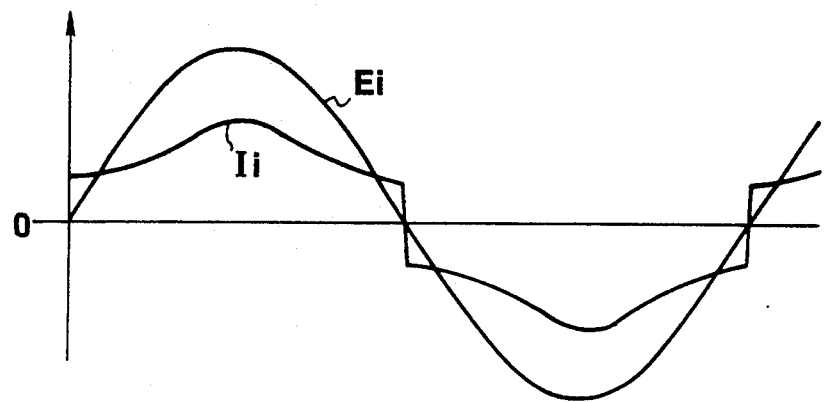
FIG. 5 is a waveform chart of the input AC voltage and AC current to the AC/DC converter shown in FIG. 3.

When the simulation for the one cycle of the alternating current frequency on the basis of the same principle of operation in the case of the first embodiment is carried out, the AC input current is formed of the waveform shown in FIG. 5 in which the DC component is superposed on the sinusodial waveform. The waveform shown in FIG. 5 corresponds to that at the time of the power factor being about 0.98.

The diode D4 shown in FIG. 6 may be omitted. In the first embodiment, no diode D4 is present. However, the operation of the first embodiment is basically unchanged if the diode d4 is added.

Third Embodiment

Figure 8:
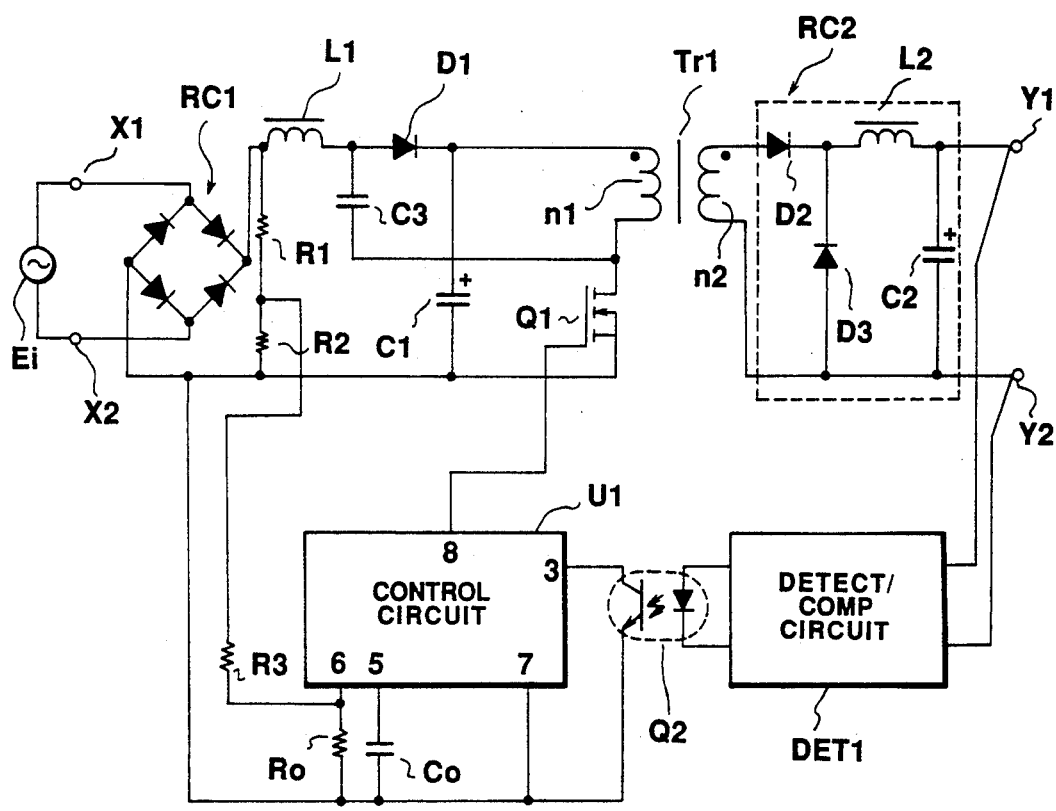
FIG. 8 is a circuit diagram of the AC/DC converter in a third embodiment according to the present invention.

FIG. 8 shows a third preferred embodiment of the AC/DC converter according to the present invention.

As shown in FIG. 8, the circuit of AC/DC converter in the third embodiment is almost the same as that in the first embodiment shown in FIG. 3.

However, the different circuit structure from the first embodiment will be described below.

That is to say, in the third embodiment, both DC output terminals of the rectifying circuit RC1 are connected with a divider constituted by resistors R1 and R2. Its divided voltage is connected to a terminal 6 of the control circuit U1 via a series resistor R3.

The circuit U1 is generally constituted by an IC manufactured by the Texas Instrument, Inc., No. TL494 or an equivalent, the integrated circuit used for a switching power supply now commercially available in the market to which an output current amplifier and a slight number of auxiliary parts are added. The terminal 6 of the control circuit U1 is a terminal at which a charge rate of an internal relaxation oscillation circuit is set. As the voltage input through the terminal 6 becomes higher, the period of charge becomes longer so that the oscillation frequency is reduced to 100 KHz. On the contrary, as the voltage to be input to the terminal 6 is reduced, the oscillation frequency is set to become as high as about 200 KHz.

Now, the behavior where the internal oscillation frequency of the control circuit U1 is varied according to an instantaneous value of the voltage immediately after the rectification by means of the rectifying circuit RC1 will be described below.

Figure 9A:
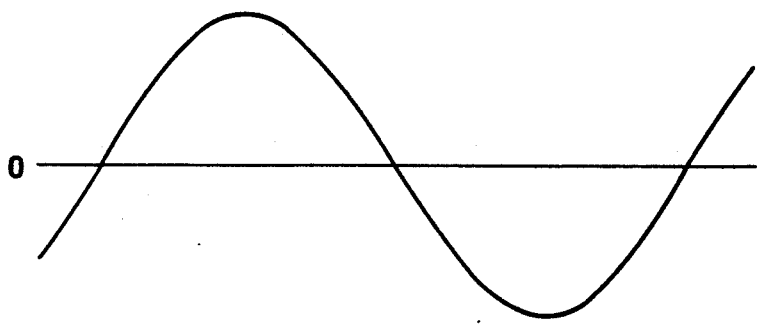
FIGS. 9(A) through 9(C) are waveform charts for explaining an operation of the third embodiment shown in FIG. 8.
Figure 9B:

In this embodiment, the internal oscillation frequency of the control circuit U1 is increased or decreased in accordance with the waveform of input AC voltage Ei as shown in FIG. 9(B).

Figure 9C:
Figure 9D:
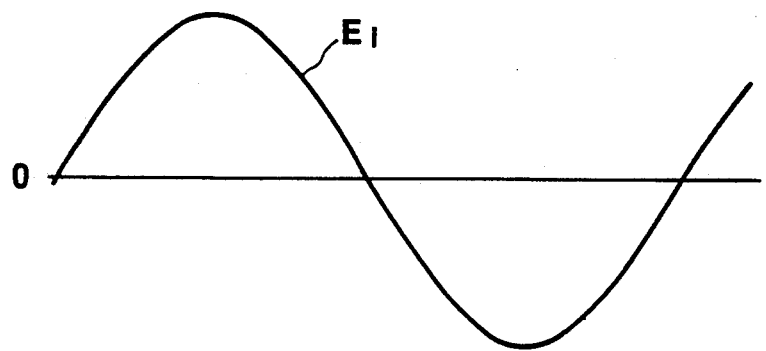
FIGS. 9(D) through 9(F) are waveform charts of the input AC currents in the case of the third embodiment shown in FIG. 8.

The output drive signal of the control circuit U1 is as shown in FIG. 9(C) as the waveform having the corresponding duty ratio. Even in this case, the duty ratio of the on time and off time of the transistor Q1 as the switching device is controlled as described above so that the stable DC output voltage is still obtained.

Figure 9E:
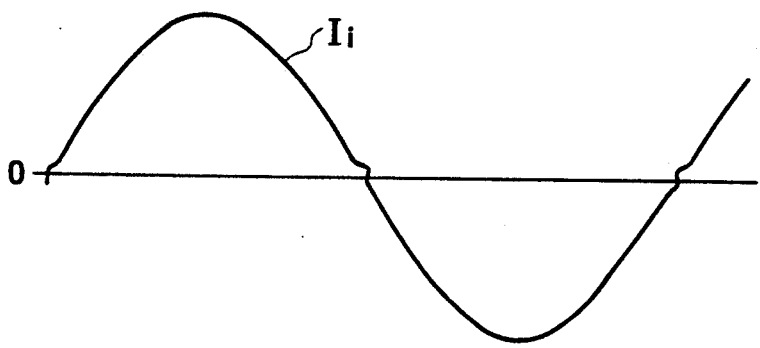
Figure 9F:
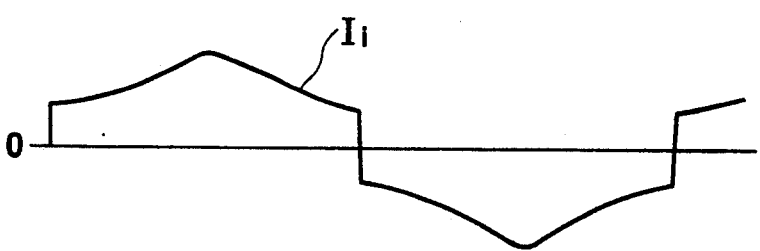

Then, a charge quantity of the capacitor C3 is varied in accordance with the phase of the input voltage Ei such that at the phase when the instantaneous input voltage becomes lower, on the contrary, the internal oscillation frequency becomes higher and the charge quantity to the capacitor C3 becomes less since the period the internal oscillation becomes shorter and, at the phase of the higher input voltage, the internal oscillation frequency is low and the charge quantity at the capacitor C3 becomes larger since the period thereof becomes longer. Thus, the waveform of the input current Ii is improved so as to approach to the waveform of the input AC voltage Ei. FIG. 9(E) shows the improved waveform appeared in the case of the third embodiment. The power factor was 0.996 at the waveform. The distortion percentage of the input current indicated about 5%.

It is noted that, in the third embodiment, although a proportional value of the instantaneous value of the output terminals at the rectifying circuit is supplied to the oscillation circuit via the resistors, the oscillation circuit is controlled via the other waveform shaping circuit and function generator so that the power factor of the converter circuitry can further approach to 1. To obtain the voltage value corresponding to the instantaneous value of the AC input voltage, not only the outputs of the main circuit rectifying circuit but also the voltage values may be obtained from the input terminals via another rectifying circuit or transformer.

Fourth Embodiment

Figure 10:
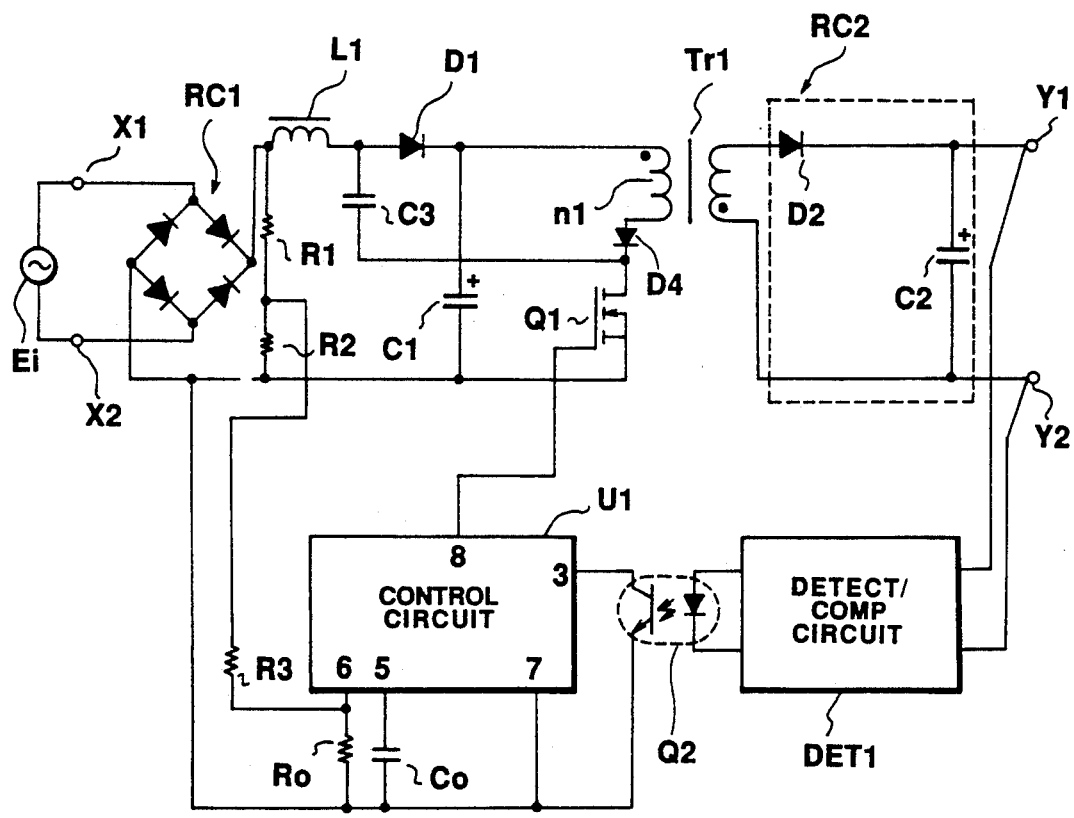
FIG. 10 is a circuit wiring diagram of the AC/DC converter in a fourth embodiment according to the present invention.

FIG. 10 shows a fourth embodiment of the AC/DC converter according to the present invention.

The structural difference from the third embodiment shown in FIG. 8 is listed below:

1) the connection polarity of the transformer Tr1 is the reverse polarity as in the case of FIG. 8;

2) the secondary winding rectifying circuit is constituted by the halfwave rectifier of only the diode D2 and capacitor C2; and 3) the presence of the diode D4 having the polarity connected in series with the primary winding n1 of the transformer Tr1.

The structural difference corresponds to the flyback type converter which is replacement with the forward type shown in FIG. 8. However, as described in the second embodiment, the diode D4 may be omitted.

Fifth Embodiment

Figure 11:
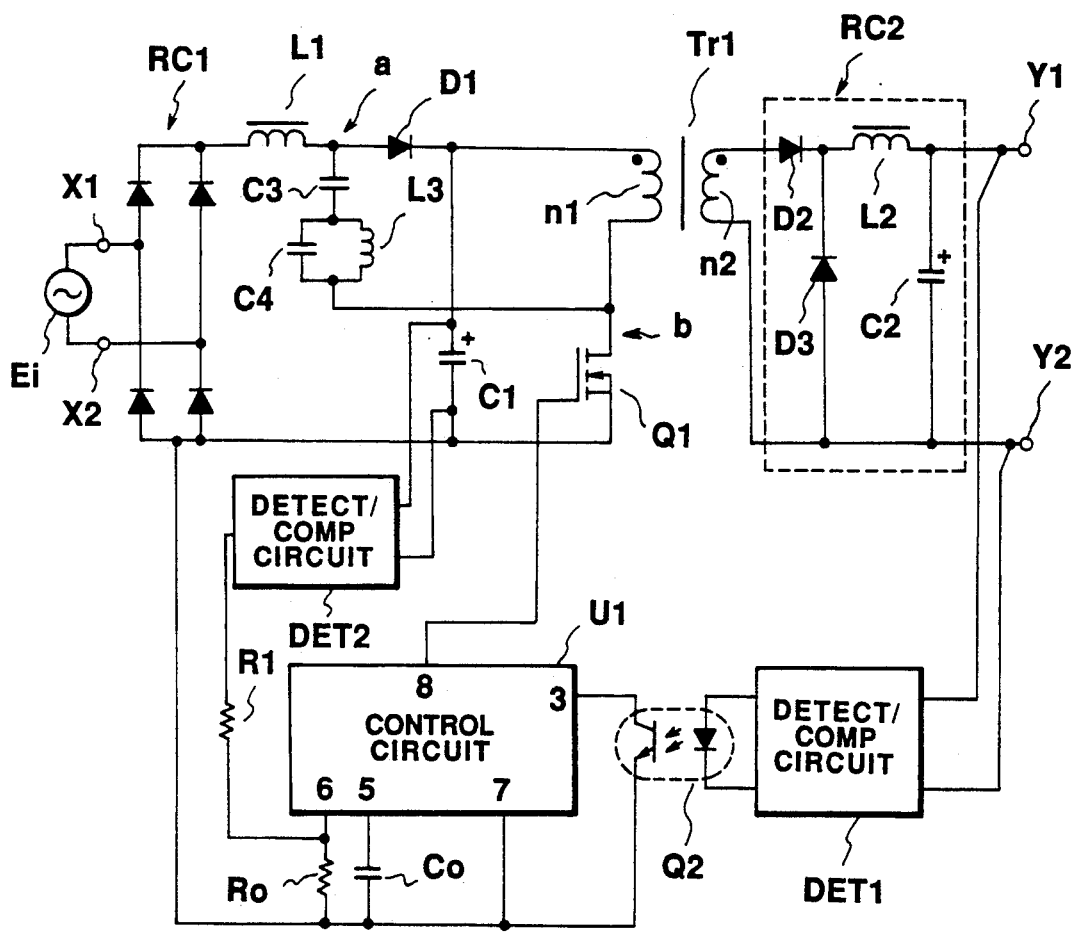
FIG. 11 is a circuit wiring diagram of the AC/DC converter in a fifth embodiment according to the present invention.

FIG. 11 shows a fifth embodiment of the AC/DC converter according to the present invention.

As shown in FIG. 11, the circuit structure of the fifth embodiment is almost the same as that of the first embodiment shown in FIG. 3 or of the third embodiment shown in FIG. 8.

However, the charge voltage across the smoothing capacitor C1 tends to increase if the load is light. A cause of increase in the voltage across the capacitor C1 during the light load is that the energy quantity stored in the choke coil L1 remains hardly unchanged since the voltage across the capacitor C3 is charged to the voltage across the capacitor C1 for every cycle of the transistor Q1 regardless of the load power. Hence, if the charge quantity across the capacitor C3 is controlled, the voltage across the capacitor C1 can be controlled.

Figure 12:
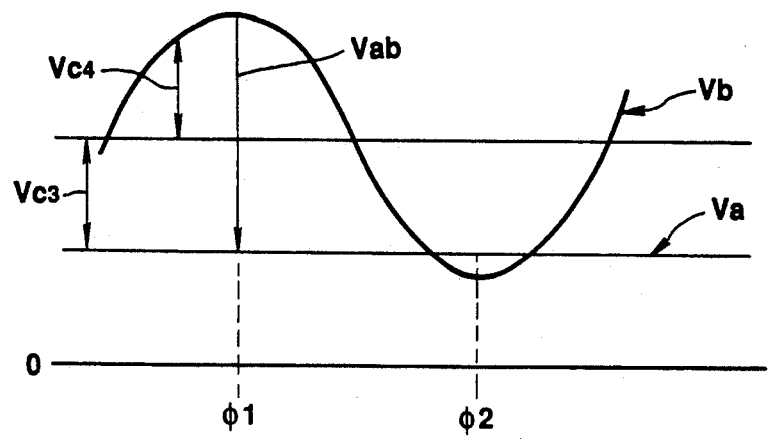
FIG. 12 is a waveform chart for explaining an operation of the AC/DC converter shown in FIG. 11.

Referring to FIG. 12, the charge quantity of the capacitor C3 is determined by a potential difference between a negative output terminal of the rectifying circuit when the transistor Q1 is turned on and a point of b. Hence, as the potential difference between the point a and point b with reference to the point b becomes large, the less charge quantity is resulted. When the potential difference is controlled, the voltage across the capacitor C1 can be controlled.

Two methods for controlling the potential difference between the points a and b when the transistor Q1 is turned on are provided.

a) the first method is to utilize free vibrations between the capacitor C4 and choke coil L3:

That is to say, when an on phase of the field effect transistor Q1 is controlled during the free vibration of the capacitor C4 and choke coil L3 so as to control the charge quantity of the capacitor C3. For example, as the voltage across the capacitor C1 becomes high the load being in the light condition, the on phase of the transistor Q1 is moved such that the voltage across the capacitor C4 or coil L3 becomes higher than the point b as the reference, i.e.. on point of time of the transistor Q1 becomes late so that the potential difference between the point a and point b is decreased and the charge quantity of the capacitor C3 is accordingly decreased.

Then, the stored energy quantity stored in the choke coil L1 is decreased and the increase in the voltage across the capacitor C1 is suppressed.

Figure 13:
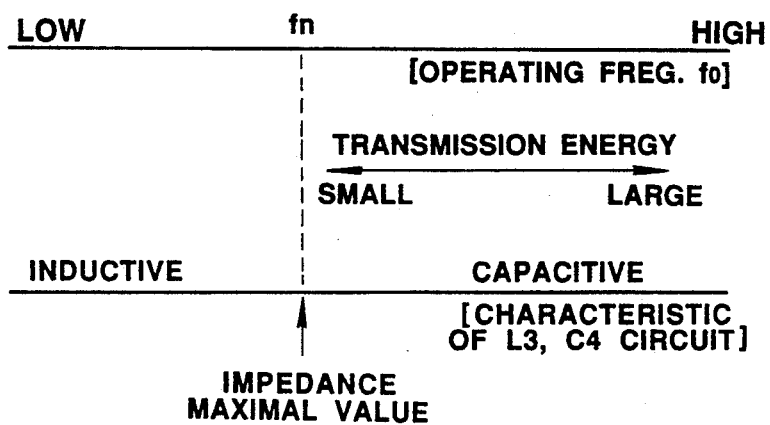
FIG. 13 is a characteristic graph representing a relationship between the operating frequency of the AC/DC converter shown in FIG. 11 and transfer energy thereof.

The operation of the parallel circuit of L3 and C4 will be described below with reference to FIG. 13.

Generally, a frequency characteristic of a parallel resonance circuit of an inductance and a capacitance provides an extremely largest value of impedance at its resonant frequency fn. At a frequency higher than the resonant frequency fn, the characteristic gives a capacitive and at a frequency lower than the resonant frequency fn, the characteristic gives an inductive. Utilizing such a characteristic as described above, a magnitude relationship in a transfer energy is cooperated with the characteristic. In details, the operation frequency fo of the converter in the fifth embodiment is operated in a range higher than the inherent vibration frequency fn. Then, utilizing the impedance characteristic of the parallel resonant circuit, when the transmission energy is large, the parallel circuit provides predominantly capacitive so that the limitation of the charge energy is not equivalently provided for the chopper circuit. On the contrary, when the transfer energy is minor, the impedance of the parallel circuit provides the larger value so that the limitation is placed on the charge energy to the chopper circuit.

In this way, the charge quantity across the smoothing capacitor C1 is automatically controlled.

b) the second method is to control the potential difference between the point a and point b when the transistor Q1 is turned on utilizing the change in the potential difference Vab between the point of a and point of b corresponding to the phase $\phi_1$ and phase $\phi_2$ shown in FIG. 12.

To change the phase, the drive frequency of the transistor Q1 as the switching element is varied. The terminal voltage of the capacitor C1 is supplied to the input ends of the detection/comparison circuit DET2.

The detection/comparison circuit DET2 serves to compare the terminal voltage of the capacitor C1 with the reference voltage and to amplify the error voltage therebetween to be supplied to the control circuit U1 via the resistor R1 so that the internal oscillation frequency is varied.

In the second method, the internal oscillation frequency becomes higher in accordance with the increase in the voltage across the capacitor C1 and the conduction of the chopper circuit is interrupted at its short on period and the input current is accordingly limited.

The voltage across the terminals Y1, Y2 is maintained constant if the ratio between the on time and off time is held constant when the frequency of the internal oscillation is varied.

The excessive or insufficient quantity of the charge energy across the capacitor is further corrected by means of one of the two methods so that the distortion of the input AC current becomes reduced.

It is noted that, in the fifth embodiment shown in FIG. 11, two methods are incorporated into the converter circuitry and, as alternative, either one method may be incorporated.

Sixth Embodiment

Figure 14:
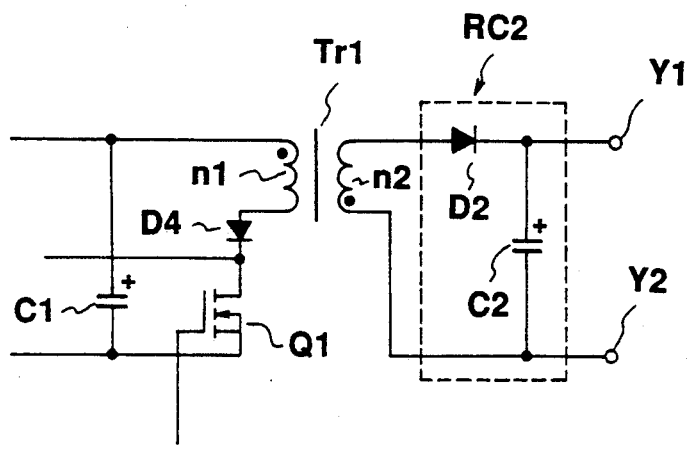
FIG. 14 is a circuit diagram of the AC/DC converter in a sixth embodiment according to the present invention.

FIG. 14 shows a sixth embodiment of the AC/DC converter according to the present invention.

The structural difference of FIG. 14 from FIG. 11 is generally the same as that between the third and fourth embodiments (refer to FIGS. 8 and 10).

Therefore, the explanation of the structure and operation of the sixth embodiment will be omitted here.

Effects achieved by the Invention

As described hereinabove, the AC/DC converter according to the present invention has the above-described features. In details, the AC/DC converter can carry out the stable control of the output voltage and simultaneously can improve the waveform of the alternating AC input current with a mere single switching element. The power factor can be improved upto about 0.98 or upto 0.996. Since the switching element is single, no mutual interference is present as in the case of the previously proposed AC/DC converter in which the pre-converter is installed. In addition, since the switching element carries out the zero volt switching and its oscillation action of the converter serves to function as a loss-less snubber, a snubber circuit for the switching device is not necessary. Furthermore, since the resonance action of the converter functions as the reset circuit of the transformer, the transformer requires no reset winding and reset diode.

Thus, the improved AC/DC converter according to the present invention can provide a simple structure. light weight, high efficiency, and high power factor.

The other various effects can be achieved by the AC/DC converter according to the present invention.

It is noted that the pair of input terminals X1 and X2 shown, e.g., in FIG. 3 may arbitrarily be formed.

While the present invention has been disclosed in terms of the embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An AC/DC converter, comprising;
   a) a pair of input terminals to be connected across a commercially available AC power supply;
   b) a full wave rectifying circuit having a pair of input terminals connected across the pair of input terminals of the AC power supply and having a pair of rectified output terminals;
   c) a first choke coil having one terminal connected to one of the pair of the rectified output terminal of the full wave rectifying circuit;
   d) a first capacitor one end connected to the other terminal of the first choke coil;
   e) a first diode whose anode terminal is connected to the other end of the first choke coil;
   f) a control circuit for generating an on and off drive signal having a relatively high frequency as compared with a frequency of the AC power supply;
   g) a second capacitor one end thereof connected to its cathode terminal of the first diode and the other end connected to the other of the pair of the rectified output terminal;
   h) switching means having a pair of main electrodes and drive electrode terminals, its drive electrode terminal being driven in response to the one and off drive signal by means of the control circuit so that said switching means is turned on and off, one of the main electrodes being connected to the other end of the first capacitor, and the other main electrode being connected to the other end of the second capacitor;
   i) a transformer having at least primary winding and secondary winding, one end of its primary winding connected to the cathode of the first diode and the other end of the primary winding being connected to the other end of the first capacitor; and
   j) rectifying means connected across the secondary winding of the transformer, the rectifying means having a pair of output terminals of the AC/DC converter.

2. An AC/DC converter as set forth in claim 1, wherein said rectifying means serves to transmit energy derived across the secondary winding of the transformer when the switching means is turned on.

3. An AC/DC converter as set forth in claim 1, wherein said rectifying means serves to transmit an energy derived across the secondary winding of said transformer when said transistor is turned off.

4. An AC/DC converter as set forth in claim 2, wherein said second capacitor has a sufficiently large electrostatic capacitance as compared with a capacitance of said first capacitor.

5. An AC/DC converter as set forth in claim 4, wherein said control circuit has a predetermined oscillation frequency range of the drive signal supplied to the switching means, the driving frequency at which the drive signal is output to the switching means in the predetermined frequency range being dependent on output voltage across the rectifying means.

6. An AC/DC converter as set forth in claim 5, which further includes a detection and comparison circuit, connected across the pair of the output terminals of the rectifying means, for comparing the output voltage with a reference voltage and outputting a signal when the output voltage is below the reference voltage, and a photo coupler receiving the output signal of the detection and comparison circuit and outputting a detection signal when the output signal of the detection and comparison circuit is received, the control circuit changing the drive frequency in response to the output signal of the photo coupler.

7. An AC/DC converter as set forth in claim 6, wherein said switching means is a field effect transistor having a gate electrode serving as the drive signal input end and a drain electrode and source electrode serving as the main electrodes.

8. An AC/DC converter as set forth in claim 7, wherein said transformer has a winding ratio of 1:1 and a connection positive polarity.

9. An AC/DC converter as set forth in claim 8, wherein said rectifying means includes: a second diode whose anode terminal is connected to a plus end of the secondary winding of said transformer; a second choke coil one end thereof connected to the cathode terminal of said second diode; a third diode whose cathode terminal is connected to the cathode terminal of said second diode and whose anode terminal is connected to a minus end of said secondary winding; and a third capacitor whose plus end is connected to the other end of said second choke coil and whose minus end is connected to the anode terminal of said third diode.

10. An AC/DC converter as set forth in claim 9, wherein said transformer has a winding ratio of 1:1 and has a connection negative polarity.

11. An AC/DC converter as set forth in claim 10, wherein said rectifying means includes: a second diode whose anode terminal is connected to a minus end of the secondary winding of said transformer and a third capacitor having a plus end connected to the cathode terminal of said second diode and having a minus end connected to a plus end of said secondary winding of said transformer.

12. An AC/DC converter as set forth in claim 8, wherein said control circuit provides a relatively high frequency drive signal as compared with an input frequency of the AC power supply.

13. An AC/DC converter as set forth in claim 12, which further includes a voltage divider, connected across the pair of output terminals of the fullwave rectifying circuit, for detecting a voltage thereacross which corresponds to an instantaneous value of the output voltage across the pair of the output terminals of said full wave rectifying circuit.

14. An AC/DC converter as set forth in claim 13, which further includes a fourth diode whose anode terminal is connected to the minus end of said primary winding of said transformer and whose cathode terminal is connected to the drain electrode of said transistor.

15. An AC/DC converter as set forth in claim 11, wherein said control circuit provides a relatively high frequency drive signal as compared with an input frequency of the AC power supply and which further includes a voltage divider, connected across the pair of output terminals of the fullwave rectifying circuit, for detecting a voltage thereacross which corresponds to an instantaneous value of the output voltage across the pair of the output terminals of said full wave rectifying circuit.

16. An AC/DC converter as set forth in claim 12, which further includes a parallel circuit of a fourth capacitor and a third coil whose one end connected to the other end of said first capacitor and whose other end is connected to the minus end of said primary winding of said transformer.

17. An AC/DC converter as set forth in claim 16, which further includes another detection and comparison circuit connected across said second capacitor for detecting the terminal voltage across the second capacitor, comparing the terminal voltage and another reference voltage for outputting another output signal when the terminal voltage is below the other reference voltage so that said control circuit outputs the drive signal frequency which is varied in response to the output signal from said other detection and comparison circuit.

18. An AC/DC converter as set forth in claim 17, wherein said full wave rectifying circuit comprises a bridge type rectifier.

19. An AC/DC converter as set forth in claim 18, wherein said drive signal oscillation frequency is approximately from 100 KHz to 200 KHz.

20. An AC/DC converter, comprising:
a) a pair of input terminals to be connected to a commercially available single phase AC power supply:
b) a full wave rectifying circuit having a pair of input terminals connected across said pair of input terminals to be connected to the commercially available AC power supply and having a pair of plus and minus rectified output terminals:
c) a smoothing capacitor having a plus end connected to the plus rectified output terminal of the full wave rectifying circuit and a minus end connected to the minus rectified output terminal thereof;
d) a transformer having at least one primary winding and secondary winding;
e) switching means having a pair of main electrodes and a drive electrode, both main electrodes being connected between said primary winding and the minus rectified output terminal of said full wave rectifying circuit, being turned on when the drive electrode receives an on drive signal, and being turned off when the drive electrode receives an off drive signal and a frequency of said on and off drive signals being higher than the frequency of said commercially available AC power supply;
f) an inductor providing a constant current supply connected between the plus rectified output terminal of said full wave rectifying circuit and a positive end of said primary winding;
g) a diode interposed between the first inductor and the positive end of said primary winding for blocking a current flow from said primary winding into said inductor, said plus end of said smoothing capacitor being connected to the plus terminal of said full wave rectifying circuit via said inductor and said diode;
h) a capacitor interposed between a junction between said first inductor and a negative end of said primary winding, said capacitor being charged according to a current flow from said inductor until its terminal voltage is equal to a terminal voltage across the smoothing capacitor when said main electrodes of said switching means are turned on so that the current energy is stored therein and a stored charge in said smoothing capacitor is supplied to said primary winding and its terminal voltage across said capacitor being reversed and said transformer being reset when a current route is formed in a loop in which the current energy is caused to flow from said primary winding, capacitor, and diode while said smoothing capacitor is charged via said diode when said main electrodes of said switching means are turned of; and
i) another rectifying circuit connected across the secondary winding of said transformer for providing a DC output voltage across a pair of output terminals of the AC/DC converter.

21. An AC/DC converter as set forth in claim 20, which further includes on and off drive signal generating means for generating the on and off drive signals to be supplied to said drive electrode of said switching means at the frequency, said frequency being varied according to the DC output voltage across the output terminals of said AC/DC converter.

22. An AC/DC converter, comprising;
a) an AC power supply;
b) a full wave rectifying circuit having a pair of input terminals connected across the AC power supply and having a pair of rectified output terminals;
c) a first choke coil having one terminal connected to one of the pair of the rectified output terminal of the full wave rectifying circuit;
d) a first capacitor one end connected to the other terminal of the first choke coil;
e) a first diode whose anode terminal is connected to the other end of the first choke coil;
f) a control circuit for generating an on and off drive signal having a relatively high frequency as compared with a frequency of the AC power supply;
g) a second capacitor one end thereof connected to its cathode terminal of the first diode and the other end connected to the other of the pair of the rectified output terminal;
h) switching means having a pair of main electrodes and drive electrode terminals, its drive electrode terminal being driven in response to the on and off drive signal by means of the control circuit so that said switching means is turned on and off, one of the main electrodes being connected to the other end of the first capacitor, and the other main electrode being connected to the other end of the second capacitor;
i) a transformer having at least primary winding and secondary winding, one end of its primary winding connected to the cathode of the first diode and the other end of the primary winding being connected to the other end of the first capacitor; and
j) rectifying means connected across the secondary winding of the transformer, the rectifying means having a pair of output terminals of the AC/DC converter.

23. An AC/DC converter as set forth in claim 3, wherein said second capacitor has a sufficiently large electrostatic capacitance as compared with a capacitance of said first capacitor.

* * * * *